United States Patent
Su et al.

(10) Patent No.: US 9,477,717 B2
(45) Date of Patent: Oct. 25, 2016

(54) CROSS-DOMAIN MATCHING SYSTEM

(75) Inventors: Qi Su, Mountain View, CA (US); Wendell Baker, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1749 days.

(21) Appl. No.: 12/060,068

(22) Filed: Mar. 31, 2008

(65) Prior Publication Data

US 2009/0248687 A1    Oct. 1, 2009

(51) Int. Cl.
  *G06F 17/30*    (2006.01)

(52) U.S. Cl.
  CPC ... *G06F 17/30533* (2013.01); *G06F 17/30637* (2013.01)

(58) Field of Classification Search
  CPC .................... G06F 17/30533; G06F 17/30673
  USPC ......................................................... 707/731
  See application file for complete search history.

(56) References Cited

U.S. PATENT DOCUMENTS

| | | | | |
|---|---|---|---|---|
| 5,524,240 | A * | 6/1996 | Barbara et al. | 707/741 |
| 6,112,172 | A * | 8/2000 | True et al. | 704/235 |
| 7,013,290 | B2 * | 3/2006 | Ananian | 705/27 |
| 7,227,893 | B1 * | 6/2007 | Srinivasa et al. | 375/240.08 |
| 7,376,752 | B1 * | 5/2008 | Chudnovsky et al. | 709/245 |
| 2003/0050924 | A1 * | 3/2003 | Faybishenko et al. | 707/3 |
| 2004/0117164 | A1 * | 6/2004 | Elling et al. | 703/11 |
| 2004/0252889 | A1 * | 12/2004 | Liu et al. | 382/190 |
| 2005/0210149 | A1 * | 9/2005 | Kimball | 709/245 |
| 2006/0136402 | A1 * | 6/2006 | Lee | 707/3 |
| 2006/0143703 | A1 * | 6/2006 | Hopen et al. | 726/15 |
| 2007/0106659 | A1 * | 5/2007 | Lu et al. | 707/5 |
| 2008/0015937 | A1 * | 1/2008 | Perkowski et al. | 705/14 |
| 2008/0082426 | A1 * | 4/2008 | Gokturk et al. | 705/27 |
| 2009/0006360 | A1 * | 1/2009 | Liao et al. | 707/5 |

OTHER PUBLICATIONS

T. Joachims et al., "Search Engines that Learn from Implicit Feedback", 2007, IEEE.*
E. Iosif et al., "Unsupervised Semantic Similarity Computation using Web Search Engines", May 2007, IEEE.*
B. Slawski, "Fighting Web Spam with Algorithms", www.seobythesea.com, Apr. 4, 2006.*

* cited by examiner

*Primary Examiner* — Apu Mofiz
*Assistant Examiner* — Sheryl Holland
(74) *Attorney, Agent, or Firm* — Martine Penilla Group, LLP

(57) ABSTRACT

A computer implemented method for analyzing a listing object to define a match to a candidate object among many possible candidate objects is disclosed. The method includes an operation to receive a listing object as an input. The method also includes an operation to generate a set of candidate objects based on characteristics of the listing object. The candidate objecting used to generate a listing-candidate pair defined by pairing the listing object with one of the candidate objects. The method may also include operations to process the listing-candidate pair such as an operation to normalize the listing object into a canonical form. Another operation can generate a matching feature vector for the listing-candidate pair. Where the matching feature vector includes a matching score based on a common feature between the candidate object and the canonical form of the listing object. In another operation, the method analyzes the matching feature vector with a judging committee module to render a match judgment. The match judgment based on evaluating the results of the judging committee module to determine whether the listing object and the candidate object are a match. The method also includes an operation that saves the match judgment to a computer readable media.

22 Claims, 6 Drawing Sheets

CROSS-DOMAIN MATCHING SYSTEM

BACKGROUND OF THE INVENTION

Description of the Related Art

The Internet has provided an unprecedented forum for individuals to provide feedback and reviews for products and services. However, information found on the Internet can be in unstructured and disparate formats so it can be difficult to determine if multiple records are referring to the same real-world entity. For example, two data records can be stored for a hotel where one record lists, "San Jose Doubletree, 2050 Gateway Place, 408-453-4000" and the second record lists, "DoubleTree SJC, 2050 Gateway Pl, 453-4000". In this case and in many other cases, it would be advantageous to determine if the two records refer to the same hotel or two different hotels.

A variety of real-world entities can have associated records such as points of interest, businesses, consumer products, restaurants and services. Different data processing systems (e.g. websites, data aggregator firms) can compile— records for any number of real-world entities and attempting to compile the various records from various websites, data providers, and other sources while avoiding duplicate records can be difficult. The difficulty can be increased when attempting to aggregate and process records from multiple sources. One example of multiple sources would be attempting to match records for restaurants within hotels from two different sources: records purchased from a business listing aggregator and hotel reviews found on a website.

In view of the forgoing, there is a need for improved data parsing to determine if unstructured data formats are a match to a known entity in the real-world.

SUMMARY

Broadly speaking the present invention provides flexibility when determining relationships between unstructured or structured listings and candidate records that refer to or represent real-world physical entities. In one embodiment the candidate objects are generated and paired with the listing object. An orchestration engine that has been configured to determine the relationship between listing-candidate objects based on domain-specific criteria processes the combined listing-candidate object. The orchestration engine is highly configurable as various plug-ins or modules provide flexibility in changing or altering the domain-specific criteria.

In one embodiment a computer implemented method for analyzing a listing object to define a match to a candidate object among many possible candidate objects is disclosed. The method includes an operation to receive a listing object as an input. The method also includes an operation to generate a set of candidate objects based on characteristics of the listing object. The candidate object used to generate a listing-candidate pair by pairing the listing object with one of the candidate objects. The method may also include operations to process the listing-candidate pair such as an operation to normalize the listing object into a canonical form. Another operation can generate a matching feature vector for the listing-candidate pair, where the matching feature vector may include scores or tags based on common or differentiating features between the candidate object and the listing object. In another operation, the method analyzes the matching feature vector with a judging committee module to render a match judgment. The match judgment based is based on evaluating the results of the judging committee module to determine whether the listing object and the candidate object are a match or have a given relationship. The method also includes an operation that saves the match judgment to a computer readable media.

In another embodiment, a system for analyzing whether a listing object and a candidate object match is disclosed. The system includes a candidate generation module that generates candidate-listing pairs. A candidate-listing pair is comprised of a candidate object associated with a listing object. The system may also include a matching module to accept candidate-listing pairs from the candidate generation module. The matching module also may include a field construction module configured to analyze candidate-listing pairs and output normalized candidate and listing objects. The matching module can also include a feature construction module configured to generate a matching feature vector from the normalized listing object and the candidate object. The matching feature vector may include scores or tags based on common or differentiating features between the candidate object and the listing object. Also part of the matching module is a judging committee module configured to generate criterion judgments based on analysis of the matching feature vector with domain-specific matching criteria. Another component of the matching module is a judgment aggregation module defined to generate an output judgment based on a plurality of criterion judgments.

In yet another embodiment a computer readable media including program instructions for analyzing a listing object to define a match to a candidate object among many possible candidate objects is disclosed. The computer readable media can include program instructions that receive a listing object as an input and program instructions that generate a set of candidate objects based on characteristics of the listing object. The program instructions can also pair each of the set of candidate objects with the listing object to define a listing-candidate pair. Program instructions can also be included to normalize the listing object into a canonical form and generate a matching feature vector for a listing-candidate pair. The matching feature vector including a matching score based on a common features between the candidate object and the canonical form of the listing object. Program instructions may also analyze the matching feature vector using a judging committee module and render a match judgment by evaluating the results of the judging committee module to determine whether the listing object and the candidate object are a match. There can also be program instructions that save the match judgment to a computer readable media.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

An invention is disclosed for determining relationships between data records that refer to real world entities. The Internet has provided unprecedented access for users to create and access user-generated content regarding product or service reviews. Broadly speaking, individual product and services reviews can be viewed as individual data records. However, the vast quantity of structured and unstructured data records available commercially or via the internet can make it difficult to determine if two records are referring to the same product or service.

The term "matching" as used below should not be construed to require a quality of sameness for two objects. In some embodiments, the system described below can be used to discover richer relationships between objects beyond a simple "match".

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
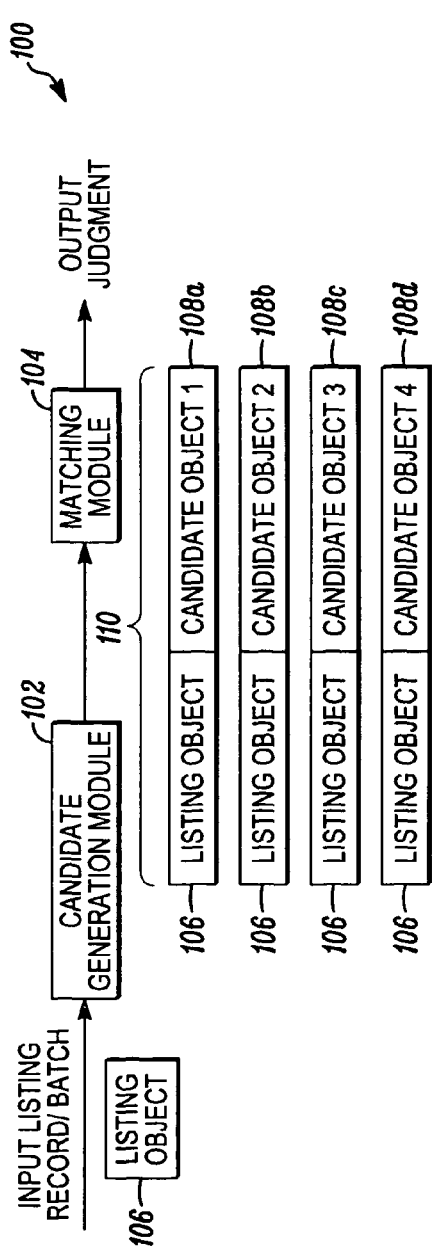
FIG. 1 shows an overview of an exemplary system 100 that includes a candidate generation module 102 and a matching module 104, in accordance with one embodiment of the present invention.

FIG. 1 shows an overview of an exemplary system 100 that includes a candidate generation module 102 and a matching module 104, in accordance with one embodiment of the present invention. A listing object 106 can be input to the candidate generation module 102 in order to generate a set of candidate objects. The individual candidate objects within the set are then paired with the listing object 106 to create listing-candidate pairs 110. Each individual listing-candidate pair 110 has the listing object 106 associated with a candidate object 108. The listing-candidate pairs 110 are input to the matching module 104 where an output judgment is rendered for each of listing-candidate pair 110.

In one embodiment, given a listing object 106, the candidate generation module 102 returns a list, or set, of candidate objects or candidate records. The candidate generation module 102 is intended to filter or narrow down the number of candidate objects that are processed by the matching module 104. The candidate generation module 102 can be implemented as a database query or using a text search engine. In one embodiment, the candidate generation module 102 can use the open source engine Lucene. In another embodiment, a proprietary search engine can be used in order to generate a set of candidate objects based on the listing object.

As illustrated in FIG. 1, using the listing object 106 as input for the candidate generation module 102 results in the multiple listing-candidate pairs where the listing object 106 is associated with multiple different candidate objects 108a-108d. The individual listing-candidate pairs 110 are then input to the matching module 104 in order to render an output judgment regarding whether the listing object 106 and the individual candidate objects 108a-108d are a match. In one embodiment, the input listing specifies the listing object, a database to search for candidate objects, and a type of relationship to discover. For example, the input to the candidate generation module can be <"DoubleTree San Jose . . . , database of hotels, match>. This exemplary string would result in the candidate generation module 102 producing a list of candidate objects that potentially match (i.e. are the same real-world entity as) the listing object. Similarly, suppose the input is <DoubleTree San Jose . . . , database of businesses, collocation>. This exemplary string would result in the candidate generation module 102 producing a candidate list that includes restaurants, spas, gift shops and other businesses that are collated with listing object.

Figure 2:
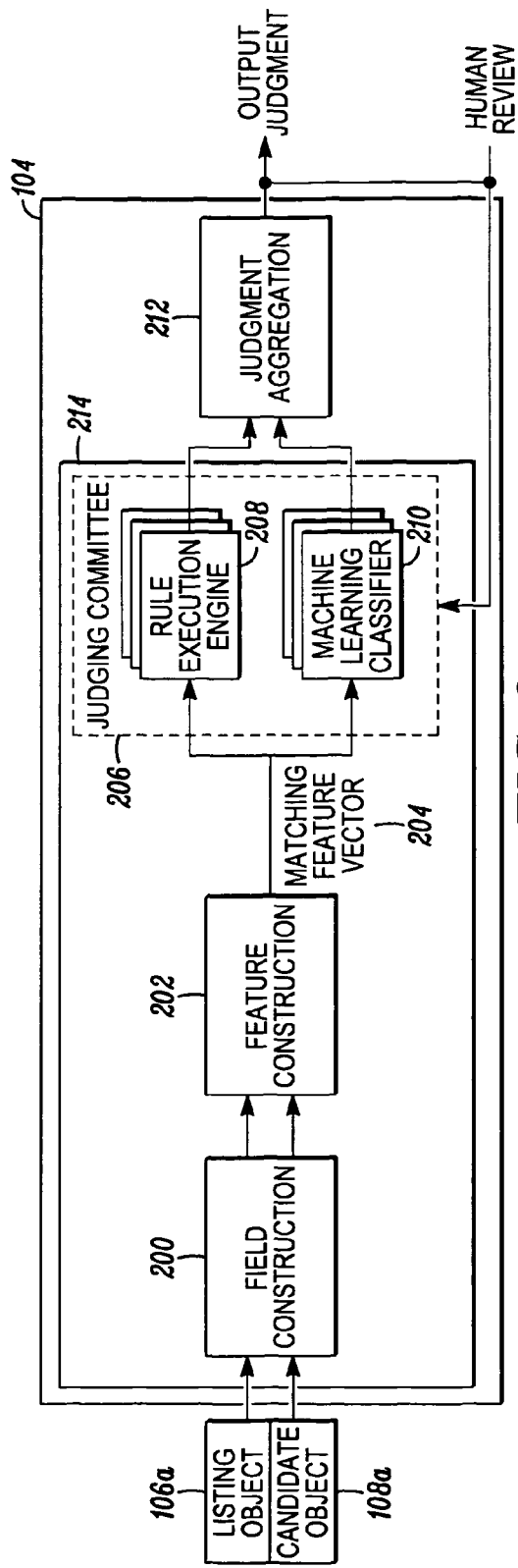
FIG. 2 illustrates an overview of how the listing candidate pair 110 is processed by various plug-ins of the matching module 104 in accordance with one embodiment of the present invention.

FIG. 2 illustrates an overview of how the listing candidate pair 110 is processed by various plug-ins of the matching module 104 in accordance with one embodiment of the present invention. One component of the matching module 104 is an orchestration engine 214. Included in the orchestration engine 214 are various plug-in modules that are also referred to as simply "modules". Broadly speaking, the modules are various sets of libraries that perform a variety of functions that will be discussed below. The configuration of the orchestration engine 214 contains domain-specific information regarding the incoming listing-candidate pair 110 as well as specifications of the plug-in modules to be applied to the listing-candidate pairs. The orchestration engine can also include domain-specific configurations that specify the schema for input records.

The field construction module 200 is a plug-in that can be customized and selected for domain-specific listing-candidate pairs. In one embodiment, the field construction module 200 parses unstructured data from the listing object 106a for domain-specific information. The field construction module 200 can also format the parsed domain-specific information into a normalized canonical form. In one embodiment, the field construction module 200 does not alter the candidate object 108a. In other embodiments, the field construction module 200 can ensure that the contents for the candidate object 108a are in a specified format.

A feature construction module 202 can process the listing-candidate pair 110 to create a Matching Feature Vector (MFV) 204. The MFV 204 is passed to the Judging Committee Module (JCM) 206. The JCM 206 can include a rule execution engine 208 and a machine learning classifier 210. Both the rule execution engine 208 and the machine learning classifier 210 can also be considered plug-in modules that include domain-specific criteria that are used to render a criteria judgment of "match" or "no match" for the matching feature vector.

As shown in FIG. 2, the judging committee module 206 can apply multiple rule execution engines. Similarly, the judging committee module 206 can also utilize multiple machine learning classifiers. FIG. 2 is intended to be exemplary and while three rule execution engines and three machine learning classifiers are illustrated, the actual number used can vary depending on domain-specific characteristics and other factors.

The individual criteria judgments from the rule execution engine 208 and the machine learning classifiers 210 are used as input to a judgment aggregation module 212. Thus, in the embodiment illustrated in FIG. 2, the judging committee module 206 will pass a total of six criteria judgments to the judgment aggregation module 212 (three criteria judgments from the three rule execution engines and three criteria judgments from the three machine learning classifiers). The judgment aggregation module 212 can apply a variety of weighting techniques to the various criteria judgments to produce an output judgment. In one embodiment, the output judgment is a simple "match" or "no match" for the input listing-candidate pair 110. In other embodiments, the judgment aggregation module 212 can include a percentage of certainty with the output judgment of "match" or "no match".

In one embodiment, the output judgment is a set of relationship tags, for example, "match" or "no match" or "collated" for listing and candidate objects that represent real-world businesses. In another embodiment, the relationship tags can be "is-a-review-of" or "not-a-review-of" for a listing and candidate objects that represent a real world product and a product review. The relationship tags provided are intended to be exemplary and are not intended to be comprehensive. Different relationship tags can be created based on the products or objects that are being compared. Similarly, when performing data mining or attempting to find semantic relationships, different relationship tags can be used.

In some embodiments, the output judgment is subjected to human review. The human review can compare the results of the judgment aggregation for known listing-candidate pairs to further refine either the machine learning classifiers 210 or rule execution engines 208.

Figure 3A:
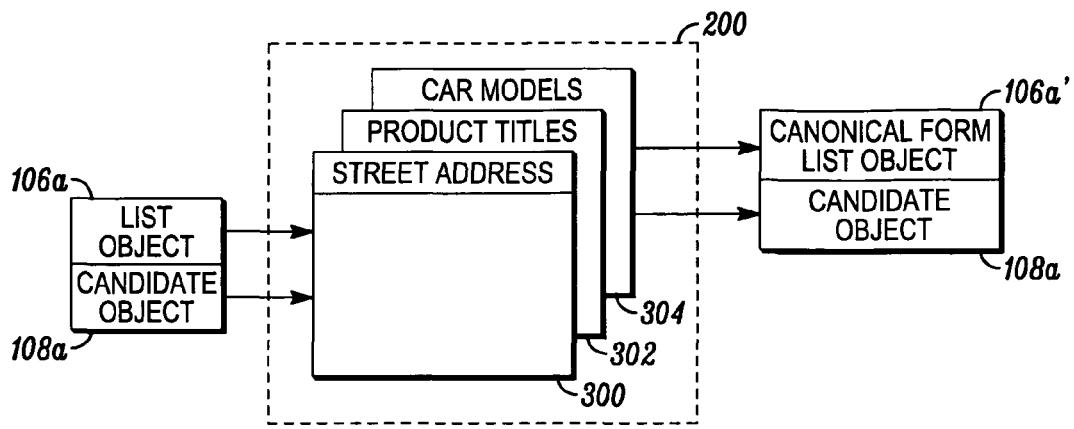
FIGS. 3A and 3B illustrate how domain-specific libraries can be used within the field construction module 200 in accordance with one embodiment of the present invention.
Figure 3B:
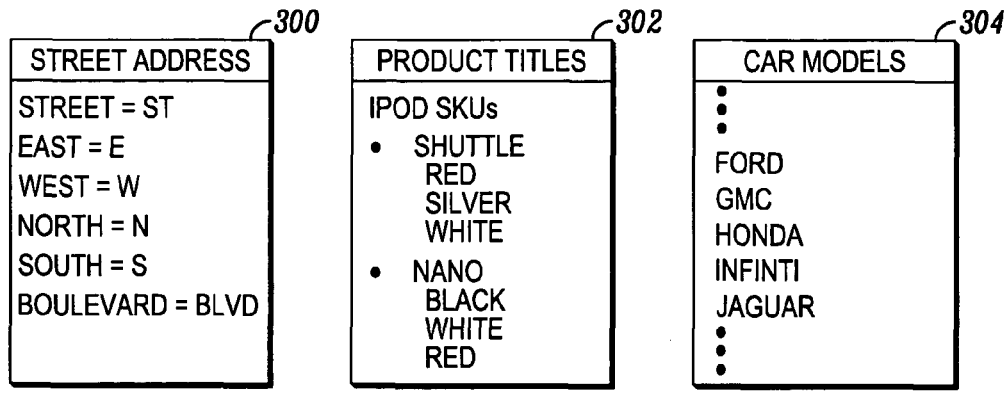

FIGS. 3A and 3B illustrate how domain-specific libraries can be used within the field construction module 200 in accordance with one embodiment of the present invention. The field construction module 200 can be used to parse and format data from an unstructured listing object into a normalized canonical form. Domain-specific libraries 300, 302 and 304 can be loaded into the field construction module 200. The domain specific libraries can define fields that may be populated when parsing the listing object 106a. Thus, as the field construction module parses listing records, the synonym dictionaries and other domain-specific libraries can be used to populate the record fields so information and data within the unstructured listing record is normalized into a canonical form.

For example, hotel records may include fields for: name, address, city, state, zip code, and phone number. In another embodiment, car models can include fields such as: year, make, model, and color. In still another embodiment, fields can be specified for product identifiers such as universal price codes, stock keeping units, and model designations. The individual libraries can also include synonym dictionaries that can relate commonly found domain-specific abbreviations and acronyms. The provided examples are intended to be exemplary and should not be considered comprehensive. Additional libraries can be constructed and used within the field construction module.

Figure 3C:
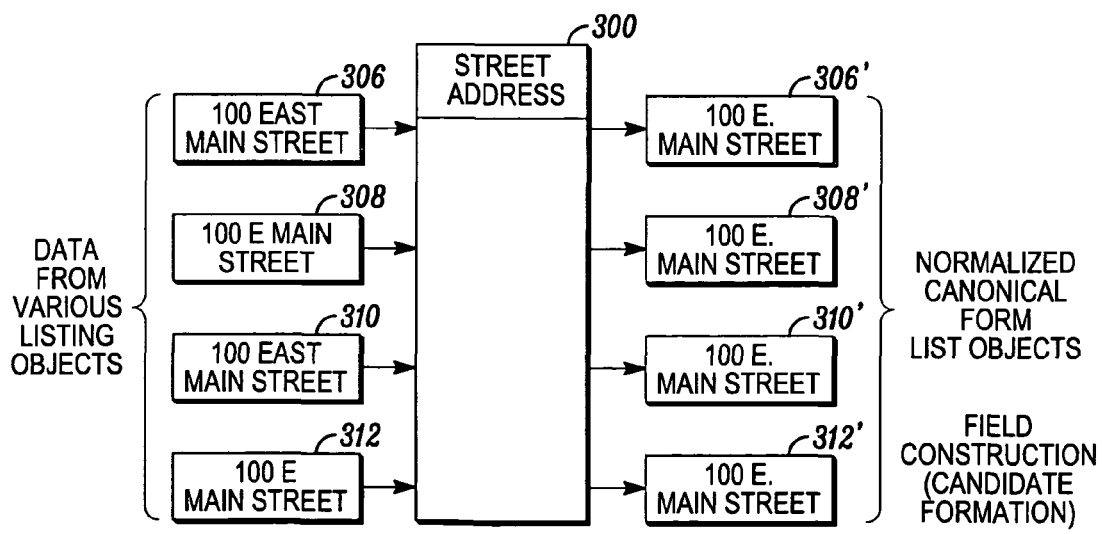
FIG. 3C is an exemplary illustration of how address data from various listing-candidate pairs can be normalized, in accordance with one embodiment of the present invention.

FIG. 3C is an exemplary illustration of how address data from various listing-candidate pairs can be normalized, in accordance with one embodiment of the present invention. FIG. 3C illustrates four different listing objects being input to the field construction module 200 with a domain-specific library 300. In this embodiment, the domain-specific library 300 is intended to place addresses in a normalized canonical form. In some embodiments, the field construction modules 200 can simultaneously process multiple listing objects, in other embodiments, each listing object 306-312 would be processed serially.

In the simplified example, the street address domain-specific library can include fields for various address elements such as number, directional street prefix, street name, street suffix, and directional street suffix. Each field can include domain-specific information, for example, the directional street prefix can include North, N, South, S, East, E, and West, W, or logical two letter combinations thereof. Similarly, the domain-specific library 300 can include instruction that format addresses within the listing objects to a specified format. In one embodiment, when the various listing objects 306-312 are processed by the field construction module 200, the output is normalized canonical listing objects 306'-312'.

Figure 4A:
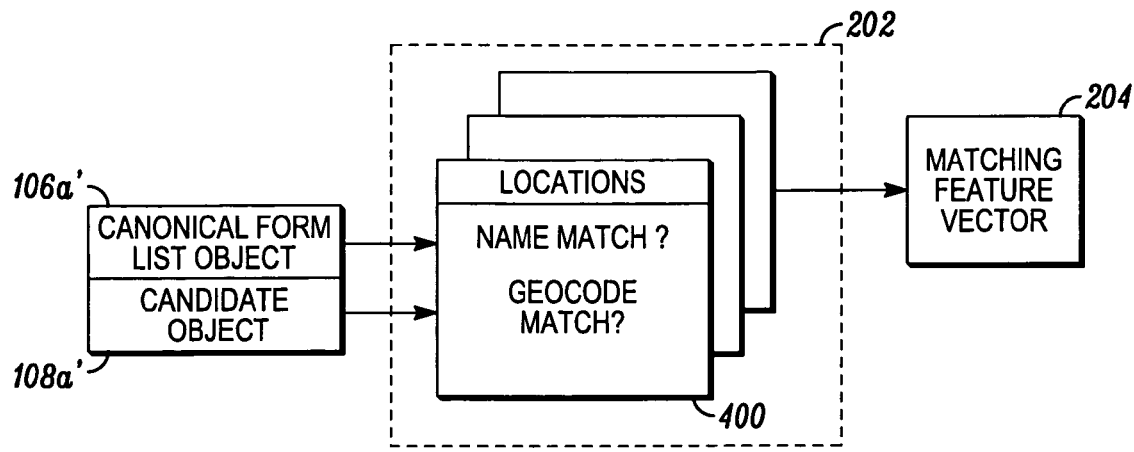
FIG. 4A is an exemplary illustration of how feature construction can be performed on the canonical form listing object 106a' and the candidate object 108a in accordance with one embodiment of the present invention.

FIG. 4A is an exemplary illustration of how feature construction can be performed on the canonical form listing object 106a' and the candidate object 108a in accordance with one embodiment of the present invention. Since the original unstructured listing object has been parsed and formatted into the canonical listing object 106a', features between the canonical listing object 106a' and the candidate object can be compared. Returning to the hotel example, a domain-specific library 400 can be used to compare location features. For example, features compared in FIG. 4A include a name match and a geocode match. For a name match, the feature construction module 202 can return "equal" if the canonical form listing object name field and a candidate object name field are a match.

Another feature could be a name similarity score. In one embodiment, the name similarity score can be computed as one minus the Levenshtein edit distance normalized by the greater of the lengths of the two names. For example, suppose to the name field of the listing and candidate objects are "Yahoo" and "Yoohoo". The Levenshtein edit distance between the two names is three. The greater of the lengths of the two names is six. Thus, in this example, the similarity score would be computed as 1−(3/6), or 0.5. This example is intended to be exemplary and other features could also be derived from other string distance measures.

Another feature could be a geocode match such as geocode_distance that submits a pair of addresses to a geocoder to retrieve a pair of latitude and longitude values in order to compute a distance between the addresses. In one embodiment, the distance between the two addresses can be correlated to a score that is indicative of a match. In an exemplary embodiment, the distance between the two addresses can be used as a score and the smaller the score, the more likely the two addresses match. In other embodiments, a distance below a maximum threshold value can return "equal" while a distance above the maximum threshold value can return "not equal". Individual scores can be assigned to the various feature matching criteria such as name matching or geocode matching. The individual scores can be combined into a Matching Feature Vector (MFV) 204 that relates the potential match likelihood of the canonical form of the listing object and the candidate object.

Figure 4B:
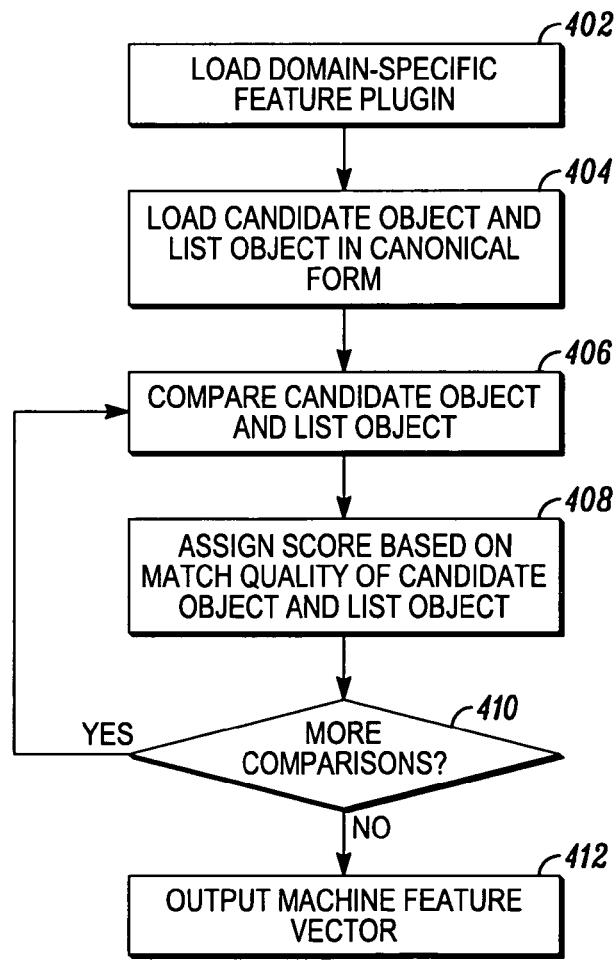
FIG. 4B is an exemplary flow chart illustrating a procedure to process the listing object and the candidate object with the feature construction module 202, in accordance with one embodiment of the present invention.

FIG. 4B is an exemplary flow chart illustrating a procedure to process the listing object and the candidate object with the feature construction module 202, in accordance with one embodiment of the present invention. Operation 402 loads a domain-specific library plug-ins to the feature construction module 202. As previously discussed, the domain-specific library can be selected based on the original listing object and candidate object. Operation 403 loads the candidate object and the canonical form of the listing object to be processed by the domain-specific library. Operation 406 compares a feature of the canonical form of the listing object to the candidate object using the criteria specified within the domain-specific library. Operation 408 assigns a score to the feature compared in operation 406. Operation 410 checks if the domain-specific library requires additional comparison between features of the candidate object and the listing object. If additional comparison can be made, the procedure returns to operation 406. If there are no other features to compare, the procedure continues with operation 412 that aggregates the individual scores from operation 408 into the matching feature vector.

Figure 5:
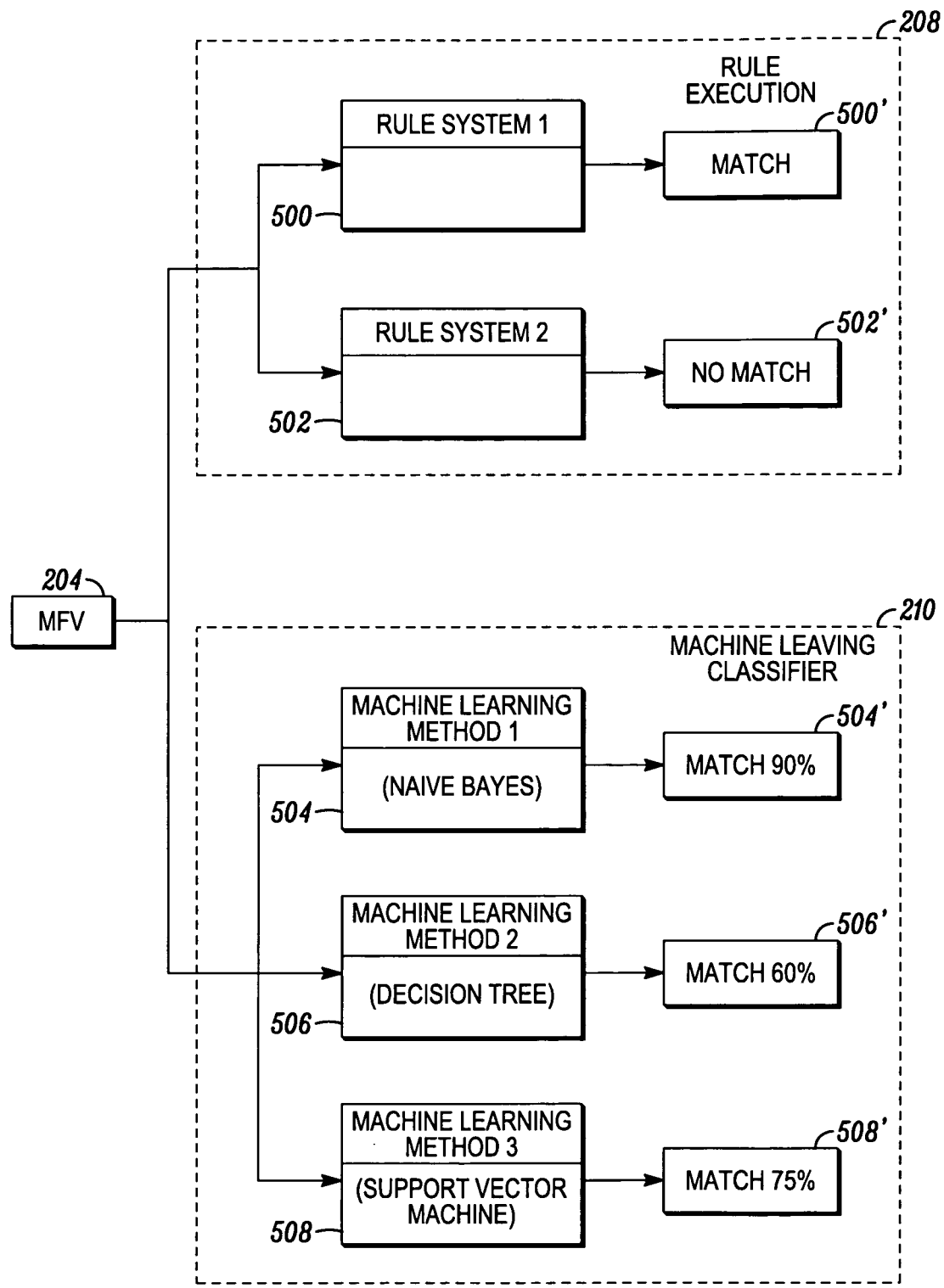
FIG. 5 is an exemplary view of the judging committee module 206, in accordance with one embodiment of the present invention.

FIG. 5 is an exemplary view of the judging committee module 206, in accordance with one embodiment of the present invention. The judging committee module 206 can include domain-specific plug-ins for the rule execution engine 208 and the machine learning classifier 210. In some embodiments, both the rule execution engine 208 and the machine learning classifier 210 uses multiple plug-ins. In other embodiments, only the machine learning classifier 210 includes the use of multiple plug-ins. In still further embodiments, the rule execution engine 208 can utilize multiple plug-ins while the machine learning classifier utilizes a single plug-in.

In additional embodiments, a machine learning classifier 210 can be used to analyze particular aspects of the matching feature vector while allowing the rule execution engine to analyze other aspects of the same matching feature vector. For example, when matching business records, a machine learning classifier can be used to analyze the business name field and address aspects of the matching feature vector while a rule execution engine can be used to analyze the phone number. The embodiments of the judging committee modules are intended to be exemplary and other combinations are possible, the particular examples listed should not be considered exhaustive or limiting.

The domain-specific plug-ins loaded into the rule execution engine 208 can be rule systems consisting of a set of rules with precedence. For example, a high precedence rule in English might be, "if name, address, and phone are all identical, then the two records are a match." This rule assumes that matching feature vector generated by the feature construction module includes matching scores for the name, address, and phone number. In the exemplary embodiment illustrated in FIG. 5, the rule execution engine 208 includes rule system 1 500 and rule system 2 502. The matching feature vector 204 is input to the individual rule systems 500, 502 to produce individual criterion judgments 500' and 502'. While not shown in FIG. 5, in other embodiments, some or all of the criterion judgments from the rule systems can include confidence values.

The machine learning classifiers can be trained on feature vectors were pre-labeled with judgments. As illustrated in FIG. 5, in some embodiments, multiple classifiers are used for improved robustness. Each of the individual classifiers can use known machine learning algorithms such as, but not limited to naïve bayes 504, decision tree 506, and support vector machine 508. In some embodiments, the classifiers may be trained on different subsets of training datasets. In other embodiments, the classifiers may be trained on the same subsets of training datasets. The classifiers 504-508 are applied to the matching feature vector 204 and output a criterion match 504'-508'. Generally, a confidence value is also included with the criterion match 504'-508'.

Returning to FIG. 2, the criterion judgments and any confidence values from the rule execution engine 208 and the machine learning classifier 210 are used as input for the judgment aggregation module 212. The Judgment aggregation module distills the criterion judgments by the disparate classifiers and rule systems into an output judgment. In one embodiment, the criterion judgments can be viewed as equally weighted votes and the output judgment is based on a simple majority if a pre-defined threshold is satisfied. In another embodiment, the criterion judgments are weighted by any associated confidence value such that judgments with higher confidence values are weighted more than judgments with lower confidence values. As illustrated in FIG. 2, the output judgment can be subjected to human review 216. The human review can be used to create human labels that designate a listing object and candidate object a match. The human labels can be fed back into the judging committee module 206 in order to further refine the rule execution engine 208 and the machine learning classifier 210.

FIGS. 6A-6D illustrate data mining techniques that can be utilized to determine semantic relationships during the matching process, in accordance with one embodiment of the present invention. In embodiments where human labels are in use, where the listing object and candidate object are designated a match it is established that the records are equivalent. In these cases, an inference can be made regarding the domain-specific fields within the listing object and the candidate object.

Figure 6A:
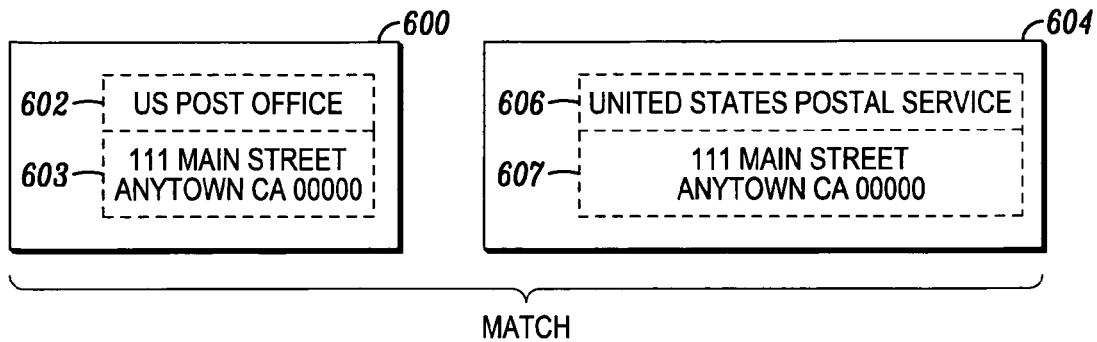
FIGS. 6A-6D illustrate data mining techniques that can be utilized to determine semantic relationships during the matching process, in accordance with one embodiment of the present invention.
Figure 6B:
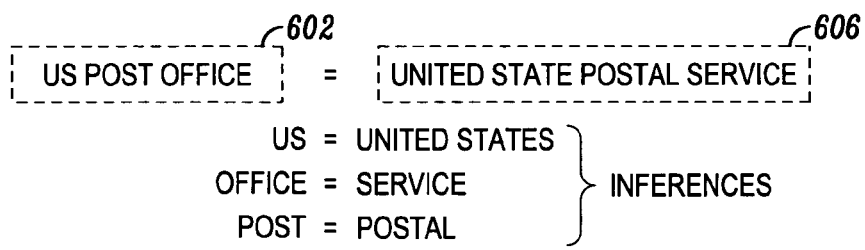
Figure 6C:
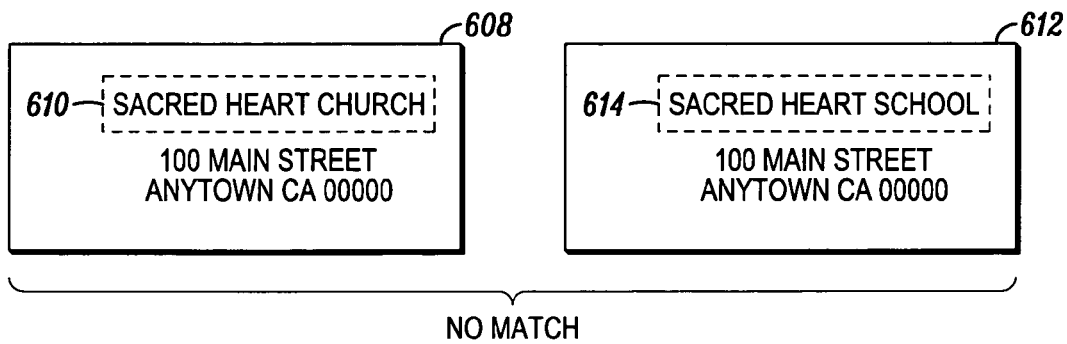
Figure 6D:
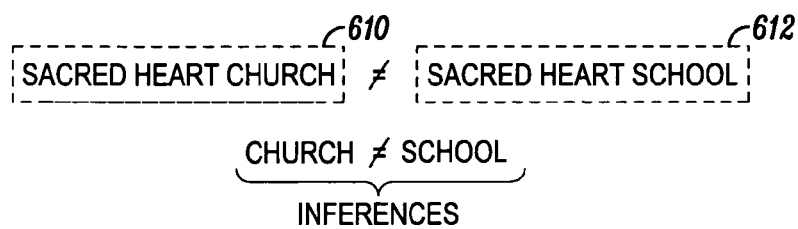

For example, in FIG. 6A the listing object 600 contains a business name 602 and address 603. Similarly, the candidate object 604 also includes a business name 606 and an address 607. If a human label designates the listing object 600 and candidate object 604 as a match, then inferences can be made regarding semantic relationships between the business names 602/606 and the addresses 603/607. Given a feature to compare, the individual components of the feature within the listing object can be compared to the matching feature fields of the candidate object. In one embodiment, words that appear in both features can be removed. This allows a correlation to be established between the remaining words of the chosen feature. As illustrated in FIG. 6B, the business name 602 includes the phrase, "U.S. Post Office" whereas the business name 606 contains the phrase, "United States Postal Service". Thus, as the names have been identified as a match an inference can be made that "U.S" is equivalent to "United States". Similarly, "office" can be inferred to be a synonym for "service" and "post" can be a synonym for "postal". In another example, shown in FIGS. 6C and 6D, a human label of "no match" results in inferences being made regarding business name 610 and business name 612. As "Sacred Heart Church" has been designated as a "no match" to "Sacred Heart School", the inference can be made that "church" is not the same, nor a synonym, for "school".

Figure 7:
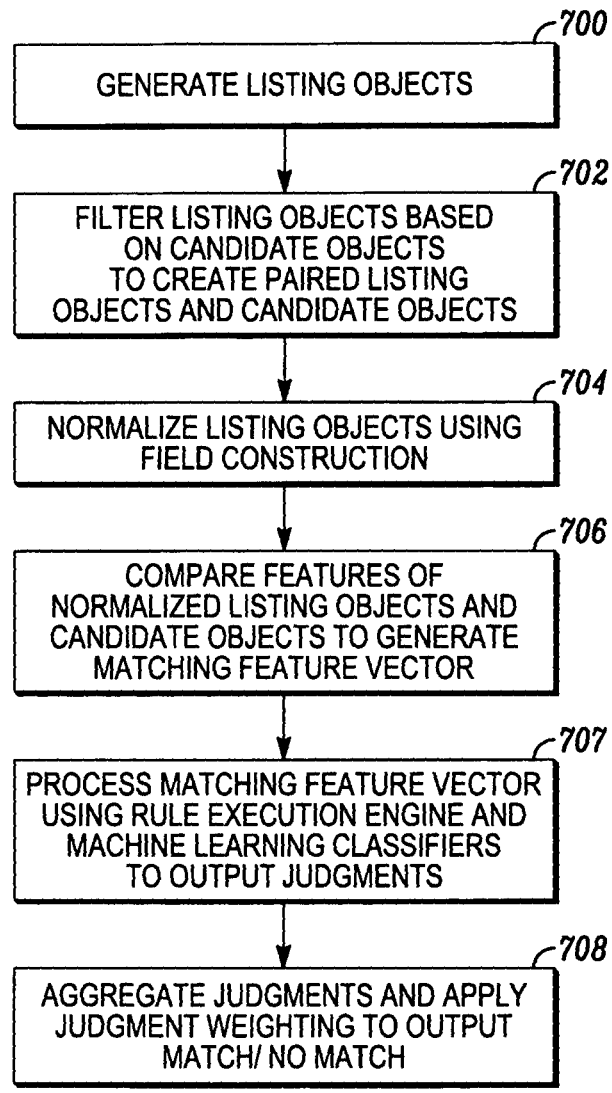
FIG. 7 is an exemplary flow chart illustrating operation to matching listing objects, in accordance with one embodiment of the present invention.

FIG. 7 is an exemplary flow chart illustrating operation to matching listing objects, in accordance with one embodiment of the present invention. Operation 700 generates candidate objects based on the listing object. Operation 700 narrows down the number of candidate objects and can be implemented as a database query or using a text search engine. Operation 702 creates listing-candidate object pairs based on the candidate objects generated in operation 700. Operation 704 normalizes the listing object by parsing unstructured data from the listing object to populate specified fields. The fields populated in operation 704 can be domain-specific entities that can be used to determine if the listing object matches the candidate object.

Operation 706 compares features of the normalized listing object and the candidate object to generate a matching feature vector. Operation 707 processes the matching feature vector using a rule execution engine and machine learning classifiers to produce individual criterion judgments. Operation 708 aggregates the individual criterion judgments and applies any judgment weighting to create an output judgment.

Though the previous discussion used the term "matching" it is not intended to imply nor require that the listing object and candidate object are necessarily the same. Rather, the "match" between the listing object and candidate object can be based on relationships defined within the matching module. Thus, the system can be used to discover richer relationships beyond a "match" designating sameness between the listing object and candidate object. Examples of the types of relationships can include, but are not limited to, "similar", "collocation", and "is-a-review-of".

For example, giving a listing object of "DoubleTree San Jose" it would be possible to find candidate objects similar by some definition within the matching module. Similarly, a listing object such as "Bellagio Resort, Las Vegas, Nev." could return candidate objects that are collected within the Bellagio such as "Michael Mina", "Bellagio Spa" and "Bellagio Casino". In still another example, given a listing object of a product type such as "Apple iPhone 6 GB, it would be possible to return candidate objects such as "CNet review of the Apple iPhone", "Epinions reviews of the iPhone 4 GB".

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above-described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data that can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for analyzing a listing object to define a match to a candidate object among many possible candidate objects, comprising;
   (a) receiving a listing object as an input;
   (b) using a text search engine to generate a set of candidate objects based on characteristics of the listing object, each of the set of candidate objects being paired with the listing object to define a listing-candidate pair, each listing candidate pair being processed by,
      (i) generating a matching feature vector for a listing-candidate pair, the matching feature vector including a matching score based on a common features between the candidate object and a canonical form of the listing object based on domain specific knowledge;
      (ii) analyzing the matching feature vector using a judging committee module; and
      (iii) rendering a match judgment by evaluating the results of the judging committee module to determine whether the listing object and the candidate object are a match, wherein the judging committee module applies a plurality of machine learning classifiers and a rule system to the matching feature vector to render the matching judgment and wherein the rule system includes a set of rules with precedence;
   (c) saving the match judgment to a computer readable media.

2. The method of claim 1, further comprising:
   repeating (b)-(i) through (b)-(iii) until the set of candidate objects has been processed.

3. The method of claim 1, further comprising:
   normalizing the listing object into a canonical form before performing operation (b)-(i).

4. The method of claim 2, wherein processing the set of candidate objects results in one or more matches.

5. The method of claim 1, wherein the listing object is an unstructured alphanumeric string.

6. The method of claim 1, wherein the text search engine is based on Lucene.

7. The method of claim 4, wherein a match is defined as the listing object and the candidate object representing the same object within a user defined degree of certainty.

8. The method of claim 4, wherein a match is defined as the listing object and the candidate object having a given relationship within a user defined degree of certainty.

9. The method of claim 1, wherein each listing candidate pair is also processed by,
   (b)-(iv) applying human review of the match judgment; and
   (b)-(i) modifying the judging committee based on the human review to generate different results from the judging committee module.

10. The method of claim 1, wherein the matching feature vector includes a name similarity score based on Levenshtein edit distance.

11. The method of claim 1, wherein the judging committee module applies a plurality of machine learning classifiers to the matching feature vector to render a judgment and a confidence value.

12. The method of claim 1, wherein one of the machine learning classifiers uses a learning method based on naïve Bayes.

13. The method of claim 1, wherein one of the machine learning classifiers uses a learning method based on a support vector machine.

14. The method of claim 13, wherein different weighting is applied to the matching learning classifier judgment and the rule system judgment when determining the match judgment.

15. A computer-implemented system for analyzing whether a listing object and a candidate object match, comprising:
- one or more processors; and
- a memory disposed in communication with the one or more processors and storing processor-executable instructions, the instructions comprising instructions for:
- a candidate generation module that uses a text search engine to generate candidate-listing pairs, a candidate-listing pair being a candidate object associated with the listing object; and
- a matching module, the matching module being defined to accept candidate-listing pairs from the candidate generation module, the matching module also including:
  - a field construction module configured to analyze candidate-listing pairs and output the candidate object and a normalized listing object based on domain specific knowledge;
  - a feature construction module configured to generate a matching feature vector from the normalized listing object and the candidate object;
  - a judging committee module configured to generate criterion judgments based on analysis of the matching feature vector with domain-specific matching criteria, wherein the analysis includes the application of at least one rule system which includes a set of rules with precedence; and
  - a judgment aggregation module defined to generate an output judgment based on a plurality of criterion judgments.

16. The computer-implemented system as in claim 15, wherein the domain-specific matching criteria includes at least one machine learning classifier.

17. The computer-implemented system as in claim 15, wherein the at least one rule system is human generated.

18. The computer-implemented system as in claim 15, wherein the domain-specific matching criteria includes a machine learning classifier and a rule system.

19. A computer-implemented system as in claim 18 wherein the machine learning classifier returns a confidence value with the criterion judgment.

20. A computer readable media, which is non-transitory, including program instructions for analyzing a listing object to define a match to a candidate object among many possible candidate objects, comprising;
- (a) program instructions for receiving a listing object as an input, wherein the listing object is taken from an input listing that specifies the listing object, a database to search for candidate objects, and a type of relationship to discover;
- (b) program instructions for generating a set of candidate objects based on characteristics of the listing object, each of the set of candidate objects being paired with the listing object to define a listing-candidate pair, each listing candidate pair being processed by,
  - (i) program instructions for normalizing the listing object into a canonical form based on domain specific knowledge;
  - (ii) program instructions for generating a matching feature vector for a listing-candidate pair, the matching feature vector including a matching score based on a common features between the candidate object and the canonical form of the listing object;
  - (iii) program instructions for analyzing the matching feature vector using a judging committee module; and
  - (iv) program instructions for rendering a match judgment by evaluating the results of the judging committee module to determine whether the listing object and the candidate object are a match, wherein the judging committee module applies a plurality of machine learning classifiers and a rule system to the matching feature vector to render the matching judgment and wherein the rule system includes a set of rules with precedence;
- (c) program instructions for saving the match judgment to a computer readable media.

21. A computer readable media including program instructions as recited in claim 20, further comprising:
program instructions for repeating (b)-(i) through (b)-(iv) until the set of candidate objects has been processed.

22. A computer readable media of claim 21, wherein the program instructions for processing the set of candidate objects results in one or more matches.

* * * * *